United States Patent Office 3,301,654
Patented Jan. 31, 1967

3,301,654
METHOD FOR THE CONTROL OF
UNDESIRABLE VEGETATION
Richard L. Dalton, Kennett Square, Pa., assignor to E. I. du Pont de Nemours and Company, Wilmington, Del., a corporation of Delaware
No Drawing. Filed Oct. 26, 1964, Ser. No. 406,596
4 Claims. (Cl. 71—2.5)

This application is a continuation-in-part of my copending application Serial No. 120,902 filed June 30, 1961, now abandoned.

This invention relates to novel uracil dimers. It is more particularly directed to uracil dimers of the following formula:

(1)

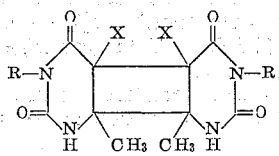

where:

X is halogen, hydrogen or methyl,
R is cycloalkyl of 5–8 carbon atoms, cycloalkenyl of 5–8 carbon atoms, phenyl, or

where:

$R_1$ is hydrogen or methyl,
$R_2$ is hydrogen, methyl, or ethyl, and
$R_3$ is alkyl of 1–6 carbon atoms.

These compounds are 3,4A,4B,6,8A,8B-hexasubstituted-4A,4B,8A,8B-tetrahydrocyclobuta[1,2-D:4,3-D']dipyrimidine-2,4,5,7-[1H,3H,6H,8H]-tetrones.

The dimers also exist as isomers of the structure shown in Formula 1. These isomers have the following structure:

(2)

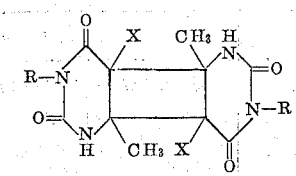

where:

X and R are as in Formula 1.

These isomers are 3,4A,4B,7,8A,8B-hexasubstituted-4A,4B,8A,8B - tetrahydrocyclobuta[1,2 - D:3,4-D']dipyrimidine-2,4,6,8-[1H,3H,5H,7H]-tetrones.

These uracil dimers are made by combining two uracil monomers. These monomers are of the formula

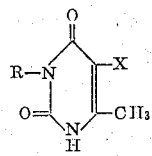

where:

R and X are as in Formula 1.

Details regarding these monomers and methods for their preparation are found in copending applications Serial Nos. 12,968, filed March 7, 1960; 84,980, filed January 26, 1961; and 89,671, filed February 16, 1961.

The dimers of this invention can be prepared by any conventional method known for dimerizing compounds having a carbon to carbon linkage. They can, for example, be prepared by the irradiation of a dry monomer with ultra-violet light. The irradiation can be accomplished while the monomer is being agitated in a blender or other similar tumbling device. Alternatively, the monomer can be irradiated as a dry thin film deposited on a suitable surface, such as a glass plate.

The irradiation can also be carried out with the uracil monomer suspended as a 1–40%, by weight, slurry in a solvent which does not absorb ultra-violet light. Suitable solvents are dioxane, carbon tetrachloride, hexane, cyclohexane and chloroform.

If the uracil monomer is soluble in water, the irradiation can be carried out by subjecting a frozen solution of the monomer to ultra-violet light. An approximately 1 millimolar solution of uracil monomer in water is made and then frozen. The uracil monomer crystallizes into aggregates which are evenly dispersed throughout the ice. This ice can then be formed or cast into films approximately one centimeter thick and irradiated.

Irradiation proceeds at a more rapid rate if the monomer particle diameters have been reduced to between 2 and 20 microns.

Ultra-violet light for this process can be derived from any standard ultra-violet lamp, such as a quartz lamp. The dimers can also be prepared using sunlight as a source of ultra-violet energy.

The length of time the monomer is subjected to ultra-violet irradiation in order to complete dimerization will, of course, vary according to the nature of the monomer and the manner in which the monomer is subjected to the rays. Generally, irradiation periods of from 10 minutes to 3 hours will be sufficient to substantially complete dimerization. Completion of the dimerization can be easily determined because it is evidenced by no further reduction in ultra-violet absorbence, as measured on a standard ultra-violet spectrophotometer.

Dimerization can also be induced, using the foregoing methods, by irradiating the uracil monomer with other high energy radiations such as gamma radiation from Cobalt–60, beta rays, X-rays of from 10,000–20,000 volts, and electron beams having energies as high as 10,000,000 volts.

The uracil dimers of this invention can also be prepared by catalysis. Suitable catalysts for inducing dimerization are $FeCl_3$, $AlCl_3$, peroxides and azonitriles. A solution or slurry of the uracil monomer is prepared, and from 0.1% to 10% of a suitable catalyst is then added. The mixture is stirred for from 30 minutes to 8 hours, or until dimerization is substantially complete as determined by ultra-violet absorbence.

Isolation of the uracil dimer is easily accomplished by extracting any unreacted monomer with a preferential solvent such as a 5% aqueous solution of sodium hydroxide, ethyl alcohol, acetonitrile, nitromethane, acetic acid, water or isopropyl alcohol. The monomer is dissolved away leaving a slurry of the dimer behind, which can then be filtered and dried. The unreacted monomer can, of course, be recycled.

Unreacted monomer can also be separated from the dimer by taking both up in a solvent and fractionally crystallizing the dimer.

The uracil dimers of this invention are excellent herbicides. They are active as general purpose weed killers, soil sterilants, in soil foliage applications, and as selective weed killers for either pre- or post-emergence weed control. They control both annual and perennial broad-leaf weeds and grasses. They can be applied to weeds growing in economic crops such as asparagus, sugar cane, gladiolus, onions, potatoes, pineapple and safflower to get selective herbicidal activity.

The amount of uracil dimer to be used in such applications will naturally depend on the conditions of the vegetation, the degree of herbicidal activity desired, the formulation used, the mode of application, the climate, season of the year, rainfall, and the like. Recommendations as to precise amounts are therefore not possible. In general, however, for pre-emergence control, from 0.5 to 5 pounds per acre will give satisfactory results. In soil foliage applications, from 2 to 35 pounds per acre of the uracil dimer will be satisfactory.

The uracil dimers of this invention can be formulated in herbicidal compositions using conventional formulation methods and such finely divided inert diluents as talcs, natural clays, pyrophyllite, diatomaceous earth, synthetic fine silica, calcium silicate, carbonates, calcium phosphates, sulfur, lime, and such flours as walnut shell, wheat, redwood, soya bean and cottonseed.

Optionally, the dimers can be formulated into liquid herbicidal compositions by using wetting agents, dispersing agents, suspending agents and emulsifying agents, all commonly known as surface-active agents. Suitable surface-active agents are listed in U.S. Patents 2,426,417; 2,655,447; 2,412,510; and 2,139,276; "Soap and Chemical Specialties," 31, No. 7, pages 50–61; No. 8, pages 48–61; No. 9, pages 52–67; and No. 10, pages 38–67 (1955); McCutcheon in "Soap and Chemical Specialties," December 1957, January, February, March, 1958; and Bulletin E–607 of the Bureau of Entomology and Plant Quarantine of the U.S. Department of Agriculture.

The dimers can also be formulated in inert non-aqueous carriers such as aliphatic and aromatic hydrocarbons. Hydrocarbons of petroleum origin are preferred.

In such herbicidal compositions, the uracil dimer will be present in amounts ranging from 0.5% to 95%. The precise concentration of dimer will, of course, depend on the intended use for the composition.

Suitable adjuvants and methods for formulating the uracil dimers with them are described in greater detail in U.S. Patents 2,843,470; 2,849,306; 2,854,325; and 2,895,817. The portions of these patents and the patents cited therein which disclose adjuvants and methods for formulating herbicidal compositions with them are hereby incorporated into this application by reference.

The uracil dimers can be combined with other herbicides which cooperate with the dimers to give compositions having excellent herbicidal activity. Such known herbicides include 2,3,6-trichlorobenzoic acid and salts thereof
2,3,5,6-tetrachlorobenzoic acid and salts thereof
2-chloro-N,N-diallylacetamide
N,N-dipropylthiolcarbamic acid, ethyl ester
N-ethyl-N-n-butylthiolcarbamic acid, n-propyl ester
2,2-dichloropropionic acid and salts thereof
methylarsonic acid and salts thereof
borates
chlorates
ammonium sulfamate
2,4-dichlorophenoxyacetic acid
2,4,5-trichlorophenoxyacetic acid
N-phenylcarbamic acid, isopropyl ester
N-(m-chlorophenyl)carbamic acid, isopropyl ester
trichloroacetic acid
maleic hydrazide
N-ethyl-N-n-butylthiolcarbamic acid, n-propyl ester
1,1-dimethyl-3-(3,4-dichlorophenyl)urea
1,1-dimethyl-3-(p-chlorophenyl)urea
1,1-dimethyl-3-phenylurea
1-n-butyl-1-methyl-3-(3,4-dichlorophenyl)urea
1-methoxy-1-methyl-3-(3,4-dichlorophenyl)urea
1-methoxy-1-methyl-3-(p-chlorophenyl)urea
1,1,3-trimethyl-3-(3,4-dichlorophenyl)urea
2-chloro-4,6-bis(ethylamino)-s-triazine
2-chloro-4-ethylamino-6-isopropylamino-s-triazine
2-chloro-4,6-bis(methoxypropylamino)-s-triazine
2,4-bis(isopropylamino)-6-methylmercapto-s-triazine
2-ethylamino-4-isopropylamino-6-methylmercapto-s-triazine
2-methoxy-4,6-bis(isopropylamino)-s-triazine
2,4-bis(isopropylamino)-6-methoxy-s-triazine
dinitro-sec-butylphenol
pentachlorophenol
2,3,6-trichlorophenylacetic acid
5,6-dihydro-(4A,6A)-dipyrido-(1,2,-A,2′,1′-C)-pyrazinium dibromide
1,1′-dimethyl-4,4′-dipyridylium di-(methylsulfate)
2,6-dichlorobenzonitrile
2,6-dinitro-N,N-di-n-propyl-α,α,α-trifluoro-p-toluidine
3-amino-1,2,4-triazole
4-hydroxy-3,5-diiodobenzonitrile
4-hydroxy-3,5-dibromobenzonitrile This invention will be more easily understood and readily practiced by referring to the following illustrative examples. In these examples, the names of the dimers have been abbreviated. The full name for these dimers is: 3,4A,4B,6,8A,8B - hexasubstituted[-4A,4B,8A,8B-tetrahydrocyclobuta[1,2-D:4,3-D′]dipyrimidine - 2,4,5,7-[1H, 3H,6H,8H]-tetrones.

In the abbreviated form, the constant portion of the name, enclosed in heavy brackets above, will be symbolized by Z.

EXAMPLE 1

*3-sec-butyl-5-bromo-6-methyluracil dimer*

Forty ml. of the sample solution (400 mg. of 3-sec-butyl-5-bromo-6-methyluracil/liter of distilled water) were frozen (Dry Ice-ethanol mixture) in an aluminum dish (110 x 140 x 38 mm.) and irradiated for 15 minutes at 5 cm. distance with two 15-watt General Electric Germicidal lamps (G–15T8). After thawing, the product was filtered and dried. Yield about 40%, M.P. 218–200°.

*Analysis:* Calc'd for $C_{18}H_{26}Br_2N_4O_4$: C, 41.50; H, 4.96; N, 10.70; M.W. 522. Found: C, 42.52; H, 5.30; N, 10.72; M.W. 502.

The dimers listed in the following table can be made in the same fashion by substituting the listed monomer reactants for 3-sec-butyl-5-bromo-6-methyluracil.

| 6-methyluracil Reactant | Tetrone Formed |
|---|---|
| 3-ethyl-5-chloro | 3,6-diethyl-4A,4B-dichloro-8A,8B-dimethyl-Z-tetrone. |
| 3-n-propyl-5-chloro | 3,6-dipropyl-4A,4B-dichloro-8A,8B-dimethyl-Z-tetrone. |
| 3-sec-butyl-5-chloro | 3,6-di-sec-butyl-4A,4B-dichloro-8A,8B-dimethyl-Z-tetrone. |
| 3-tert-butyl-5-chloro | 3,6-di-tert-butyl-4A,4B-dichloro-8A,8B-dimethyl-Z-tetrone. |
| 3-n-butyl-5-chloro | 3,6-di-n-butyl-4A,4B-dichloro-8A,8B-dimethyl-Z-tetrone. |
| 3-phenyl-5-bromo | 3,6-diphenyl-4A,4B-dibromo-8A,8B-dimethyl-Z-tetrone. |
| 3-cyclohexyl-5-fluoro | 3,6-dicyclohexyl-4A,4B-difluoro-8A,8B-dimethyl-Z-tetrone. |
| 3-cyclohexyl-5-methyl | 3,6-dicyclohexyl-4A,4B,8A,8B-tetramethyl-Z-tetrone. |
| 3-phenyl-5-methyl | 3,6-diphenyl-4A,4B,8A,8B-tetramethyl-Z-tetrone. |
| 3-cyclopentenyl | 3,6-dicyclopentenyl-8A,8B-dimethyl-Z-tetrone. |
| 3-phenyl-5-chloro | 3,6-diphenyl-4A,4B-dichloro-8A,8B-dimethyl-Z-tetrone. |
| 3-cyclopentyl | 3,6-dicyclopentyl-8A,8B-dimethyl-Z-tetrone. |
| 3-cyclooctyl | 3,6-dicyclooctyl-8A,8B-dimethyl-Z-tetrone. |
| 3-ethyl-5-methyl | 3,6-diethyl-4A,4B,8A,8B-tetramethyl-Z-tetrone. |
| 3-isopropyl | 3,6-diisopropyl-8A,8B-dimethyl-Z-tetrone. |
| 3-sec-butyl | 3,6-di-sec-butyl-8A,8B-dimethyl-Z-tetrone. |
| 3-isopropyl-5-bromo | 3,6-diisopropyl-4A,4B-dibromo-8A,8B-dimethyl-Z-tetrone. |
| 3-tert-octyl | 3,6-di-tert-octyl-8A,8B-dimethyl-Z-tetrone. |
| 3-tert-butyl-5-methyl | 3,6-di-tert-butyl-4A,4B,8A,8B-tetramethyl-Z-tetrone. |
| 3-sec-amyl-5-fluoro | 3,6-sec-amyl-4A,4B-difluoro-8A,8B-dimethyl-Z-tetrone. |
| 3-ethyl-5-bromo | 3,6-diethyl-4A,4B-dibromo-8A,8B-dimethyl-Z-tetrone. |
| 3-n-hexyl | 3,6-dihexyl-8A,8B-dimethyl-Z-tetrone. |
| 3-n-butyl-5-methyl | 3,6-di-n-butyl-4A,4B,8A,8B-tetramethyl-Z-tetrone. |

EXAMPLE 2

Pellets

| | Percent |
|---|---|
| 3,6-diisopropyl-4A,4B-dichloro-8A,8B-dimethyl-Z-tetrone | 25 |
| Anhydrous sodium sulfate | 10 |
| Sodium lignin sulfonate | 10 |
| Calcium-magnesium bentonite | 55 |

These components are blended and micropulverized, then moistened with 18–20% water and extruded. The extrusions are cut as formed and dried to give pellets.

These pellets control weeds along highway guard rails, and around bridges, cyclone fences and highway signs. They can be applied by hand at 10–25 pounds of active ingredient per acre to give excellent control of such woody plants as oak, maple, sweet gum and willow.

EXAMPLE 3

Aqueous suspension

| | Percent |
|---|---|
| 3,6-dicyclohexyl-4A,4B,8A,8B-tetramethyl-Z-tetrone | 28 |
| Sodium lignin sulfonate | 15 |
| Hydrated attapulgite | 2 |
| Disodium phosphate | .8 |
| Sodium pentachlorophenate | .5 |
| Water | 53.5 |

These ingredients are pebble or sand milled until the particles of active material are less than 5 microns in diameter. The resulting thixotropic suspension is stable and does not cake. It can be readily diluted with water to form a slow settling suspension which requires no agitation during application.

Applied as a directed spray at 1–3 pounds of active ingredient per acre in 30 gallons of water, this formulation gives good pre-emergence control of barnyard-grass, mustard species and jungle rice in sugar cane.

EXAMPLE 4

Emulsifiable oil suspension

| | Percent |
|---|---|
| 3,6-dicyclohexyl-4A,4B-dibromo-8A,8B-dimethyl-Z-tetrone | 25 |
| Blend of polyalcohol carboxylic acid esters and oil-soluble petroleum sulfonates | 6 |
| Diesel oil | 69 |

These components are mixed together and milled in a roller, pebble or sand mill until the particles of active material are less than 10 microns in diameter. The resulting suspension can be emulsified in water or diluted further with weed oils for spray application.

This formulation, diluted with 80 gallons of Lion Herbicidal Oil No. 6 and applied at 12 pounds of active ingredient per acre gives excellent control of morningglory yarrow, ragweed, wild carrot, quackgrass, witchgrass, crabgrass, and oak and maple seedlings growing along railroad rights-of-way.

EXAMPLE 5

Emulsifiable oil

| | Percent |
|---|---|
| 3,6-diisopropyl-4A,4B-dibromo-8A,8B-dimethyl-Z-tetrone | 20 |
| Alkyl aryl polyether alcohol | 2.5 |
| Oil-soluble petroleum sulfonate | 2.5 |
| Methyl isobutyl ketone | 75 |

These components are mixed until they form a homogeneous solution, which is then emulsified in water for application.

The emulsifiable oil is useful for weed control on railroad rights-of-way, in railroad yards and on sidings. Diluted with 100 gallons of water per acre and sprayed at 10–20 pounds of active ingredient per acre, quackgrass, crabgrass, Bermuda grass, bromegrass, ragweed, cockleburr, lamb's-quarters and mare's tail are controlled for extended periods.

EXAMPLE 6

Wettable powder

| | Percent |
|---|---|
| 3,6-di-sec-butyl-4A,4B-dichloro-8A,8B-dimethyl-Z-tetrone | 80 |
| Sodium lauryl sulfate | .6 |
| Sodium lignin sulfonate | 2.0 |
| Kaolin clay | 17.4 |

These components are blended and micropulverized until the particles have diameters of less than 50 microns. The mixture is then reblended until it is homogeneous.

This wettable powder is used as a general purpose weed killer on industrial sites and railroad ballast. Ten to 20 pounds of active ingredient per acre in 100 gallons of water gives excellent control of goldenrod, evening primrose, pokeweed, oxeye daisy, cockleburr, goosegrass, crabgrass and lovegrass.

Twenty pounds of active ingredient per acre in 50 gallons of water gives excellent control of nutsedge.

EXAMPLE 7

Wettable powder

| | Percent |
|---|---|
| 3,6-dicyclohexyl-8A,8B-dimethyl-Z-tetrone | 80 |
| Dioctyl sodium sulfosuccinate concreted with sodium benzoate | 2 |
| Partially desulfonated sodium lignin sulfonate | 1 |
| Calcined nonswelling montmorillonoid type clay | 17 |

This wettable powder is prepared as in Example 8, but is additionally passed through an air attrition mill until the particles have diameters of under 10 mircons.

The powder is used for pre-emergence application in such crops as sugar cane, asparagus and safflower.

One-half to 2 pounds of active ingredient per acre in 40 gallons of water gives excellent control of pigweed, lamb's-quarters, purslane, mustard, crabgrass, foxtail and barnyardgrass.

EXAMPLE 8

Wettable powder

| | Percent |
|---|---|
| 3,6-dibutyl-4A,4B,8A,8B-tetramethyl-Z-tetrone | 80 |
| Sodium lauryl sulfate | .6 |
| Partially desulfonated sodium lignin sulfonate | 1 |
| Calcined nonswelling montmorillonoid type clay | 18.4 |

The ingredients are blended and micropulverized until all particles have diameters of under 50 microns.

Twenty pounds of active ingredient per acre in 100 gallons of water gives excellent control of quackgrass, crabgrass, goosegrass, Johnson grass; bitterweed, oxeye daisy, mare's tail, and maple, oak, and willow brush growing around oil tank installations and railroad ballast.

At 30 pounds of active ingredient per acre as a spot treatment, excellent control of such deep rooted weeds as bindweed and Canada thistle is obtained.

EXAMPLE 9

Granules

| | Percent |
|---|---|
| 3,6-diisopropyl-4A,4B,8A,8B-tetramethyl-Z-tetrone | 40 |
| Anhydrous sodium sulfate | 10 |
| Nonswelling calcium magnesium bentonite | 49 |
| Alkyl napthalene sulfonate, sodium salt | 1 |

These components are formulated as 4–8 mesh granules by blending and grinding the components, and then moist granulating, drying and screening them.

The granules are broadcast at 10 pounds of active ingredient per acre for excellent control of oak brush growing on light sandy soil.

It should be understood that in the foregoing examples the isomers of the listed compounds can be prepared in similar ways and can be used as herbicides with equivalent results.

I claim:

1. A method for the control of undesirable vegetation, said method comprising the application, to a locus to be protected, of a herbicidally effective amount of a compound selected from the group consisting of compounds having the formulae

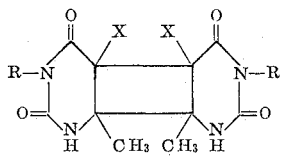

and

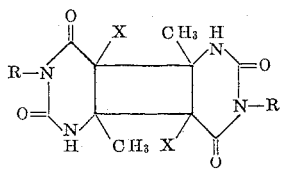

where in both formulae:

R is selected from the group consisting of cycloalkyl radicals of from 5–8 carbon atoms, cycloalkenyl radicals of from 5–8 carbon atoms and

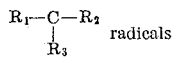

where:

$R_1$ is selected from the group consisting of hydrogen and methyl, $R_2$ is selected from the group consisting of hydrogen, methyl and ethyl, $R_3$ is selected from the group consisting of alkyl radicals containing from 1–6 carbon atoms and X is selected from the group consisting of hydrogen, halogen and methyl.

2. The method of claim 1 wherein the compound is 3,6-di-sec-butyl-4A,4B - dibromo - 8A,8B - dimethyl-Z-tetrone.

3. The method of claim 1 wherein the compound is 3,6-di-tert-butyl-4A,4B - dichloro - 8A,8B-dimethyl - Z-tetrone.

4. The method of claim 1 wherein the compound is 3,6-diisopropyl-4A,4B-dibromo-8A,8B-dimethyl-Z-tetrone.

References Cited by the Examiner

UNITED STATES PATENTS

| | | | |
|---|---|---|---|
| 2,259,925 | 10/1941 | Dalmer et al. | 260—260 |
| 2,666,057 | 1/1954 | Doran | 260—260 |
| 3,037,853 | 6/1962 | Luckenbaugh | 71—2.5 |
| 3,038,794 | 6/1962 | Geary et al. | 71—2.5 |

FOREIGN PATENTS 63,575   2/1960   Australia.

References Cited by the Applicant

R. Beukers et al., Biochim. Biophys. Acta. 41 (1960), 550–551.

A. Rorsch et al., Rec. Trav. Chim. Pays-Bas, 77 (1958), 432–429.

A. Wacker et al., Agnew. Chem., 73 (1961), 64–65.
A. Wacker et al., J. Mol. Biol., 3 (1961), 790–793.
A. Wacker et al., Naturwiss, 47 (1960), 477.
S. Y. Wang, Nature, 190 (1961), 690–694.

JAMES O. THOMAS, JR., *Acting Primary Examiner.*